United States Patent
Ono et al.

(10) Patent No.: US 9,733,122 B2
(45) Date of Patent: Aug. 15, 2017

(54) PHOTOSENSOR LENS INCLUDING A PURALITY OF CONVEX LENS SURFACES

(71) Applicants: Alpha Corporation, Yokohama-shi, Kanagawa (JP); Nissan Motor Co., LTD., Yokohama-shi, Kanagawa (JP)

(72) Inventors: Takashi Ono, Yokohama (JP); Wataru Hirai, Atsugi (JP)

(73) Assignees: ALPHA CORPORATION, Kanagawa (JP); NISSAN MOTOR CO., LTD., Kanagawa (JP)

( * ) Notice: Subject to any disclaimer, the term of this patent is extended or adjusted under 35 U.S.C. 154(b) by 215 days.

(21) Appl. No.: 14/436,518

(22) PCT Filed: Dec. 11, 2013

(86) PCT No.: PCT/JP2013/083179
§ 371 (c)(1),
(2) Date: Apr. 17, 2015

(87) PCT Pub. No.: WO2014/097940
PCT Pub. Date: Jun. 26, 2014

(65) Prior Publication Data
US 2015/0285673 A1    Oct. 8, 2015

(30) Foreign Application Priority Data

Dec. 20, 2012  (JP) ................. 2012-277828

(51) Int. Cl.
*G01J 1/04*  (2006.01)
*G02B 19/00*  (2006.01)
(Continued)

(52) U.S. Cl.
CPC ............... *G01J 1/0411* (2013.01); *G01J 1/02* (2013.01); *G01J 1/0214* (2013.01); *G01J 1/04* (2013.01);
(Continued)

(58) Field of Classification Search
CPC .......... G01J 1/02; G01J 1/0214; G01J 1/0271; G01J 1/04; G01J 1/0407; G01J 1/0411;
(Continued)

(56) References Cited

U.S. PATENT DOCUMENTS 3,724,924 A    4/1973  Lenfant et al.
2003/0169421 A1  9/2003  Ehbets
(Continued)

FOREIGN PATENT DOCUMENTS

EP    1 103 799 A2    5/2001
EP    1 314 972 A1    5/2003
(Continued)

OTHER PUBLICATIONS

Official Communication issued in corresponding European Patent Application No. 13864558.5 mailed on Oct. 16, 2015.
(Continued)

*Primary Examiner* — Francis M Legasse, Jr.
(74) *Attorney, Agent, or Firm* — Keating and Bennett, LLP

(57) ABSTRACT

An object of the present invention is to provide a photosensor lens which, in the case of using a plurality of light emitting elements to form a reflective photosensor, can maximize the efficiency of light irradiation of the light emitting elements with a simple structure. Provided is a photosensor lens configured to condense irradiation light from a plurality of light emitting elements 2 housed in a unit case 1 in a detection region 3 outside the unit case 1, and to condense reflected light from the detection region 3 at a light receiving element 4 in the unit case 1. A single convex lens surface 5 is formed on one side of the photosensor lens, and a light-receiving convex lens surface 6 sharing an optical axis with the single convex lens surface 5, and a plurality of light-emitting convex lens surfaces 7 each having an optical
(Continued)

axis in parallel with the optical axis of the light-receiving convex lens surface 6 are integrally formed on the opposite side of the photosensor lens.

4 Claims, 6 Drawing Sheets

(51) Int. Cl.

| | | |
|---|---|---|
| *G01J 1/08* | (2006.01) | |
| *G02B 3/00* | (2006.01) | |
| *G01S 7/481* | (2006.01) | |
| *G01S 17/02* | (2006.01) | |
| *G01V 8/20* | (2006.01) | |
| *G01J 1/02* | (2006.01) | |

(52) U.S. Cl.
CPC ............... *G01J 1/0407* (2013.01); *G01J 1/08* (2013.01); *G01S 7/4813* (2013.01); *G01S 17/026* (2013.01); *G02B 3/00* (2013.01); *G02B 19/0014* (2013.01); *G02B 19/0047* (2013.01); *G02B 19/0076* (2013.01); *G01J 1/0271* (2013.01); *G01V 8/20* (2013.01)

(58) Field of Classification Search
CPC ........ G01J 1/08; G01S 17/026; G01S 7/4813; G01V 8/20; G02B 19/0014; G02B 19/0047; G02B 19/0076; G02B 3/00
See application file for complete search history.

(56) References Cited

U.S. PATENT DOCUMENTS

| | | | |
|---|---|---|---|
| 2009/0102956 A1* | 4/2009 | Georgiev | ........... H04N 5/23212 |
| | | | 348/315 |
| 2012/0314417 A1 | 12/2012 | Lai et al. | |
| 2013/0169408 A1 | 7/2013 | Endo | |

FOREIGN PATENT DOCUMENTS

| | | |
|---|---|---|
| JP | 63-193102 A | 8/1988 |
| JP | 06-068755 A | 3/1994 |
| JP | 10-239451 A | 9/1998 |
| JP | 11-044578 A | 2/1999 |
| JP | 2002-214361 A | 7/2002 |
| JP | 2009-020763 A | 1/2009 |
| JP | 2009-150690 A | 7/2009 |
| JP | 2012-162908 A | 8/2012 |

OTHER PUBLICATIONS

Official Communication issued in International Patent Application No. PCT/JP2013/083179, mailed on Feb. 4, 2014.

* cited by examiner (a)

(b)

(a)

(b)

(c)

PHOTOSENSOR LENS INCLUDING A PURALITY OF CONVEX LENS SURFACES

TECHNICAL FIELD

The present invention relates to a photosensor lens.

BACKGROUND ART

A photosensor lens described in Patent Document 1 has been known as a photosensor lens including a light emitting lens portion and a light receiving lens portion formed integrally with each other. In this conventional example, the lens has a cuboidal shape with flat surfaces on the two opposite sides, and is formed to have convex lens surfaces provided at a flat surface portion facing the inside of a case for a light emitting element and a light receiving element disposed inside the case.

PRIOR ART DOCUMENT

Patent Document

Patent Document 1: Japanese Patent Application Publication No. 2009-150690

SUMMARY OF THE INVENTION

Problems to be Solved by the Invention

Here, in the conventional example mentioned above, the object side of the lens is formed by a flat surface. For this reason, in the case of disposing a plurality of light emitting elements inside the case and providing a convex lens surface for each single light emitting element, the optical axes of the convex lens surfaces for the light emitting elements (in this description, "the optical axis of a convex lens surface" refers to the optical axis of a plano-convex lens having a convex lens surface on one side) and the optical axis of the convex lens surface for the light receiving element may not coincide with each other. Thus, there is a problem in that the amount of irradiation light to the target cannot be efficiently increased even by increasing the number of light emitting elements.

This problem may be solved by forming a convex lens surface as the opposite surface from the convex lens surface for each light emitting element (the surface facing the target) and focusing the irradiation light of each light emitting element on the optical axis of the convex lens surface for the light receiving element. However, a problem arises in that the lens structure becomes complicated by forming a convex lens surface on the object side of each light-source-side convex lens surface.

The present invention has been made in view of solving the above disadvantages, and an object thereof is to provide a photosensor lens which, in the case of using a plurality of light emitting elements to form a reflective photosensor, can maximize the efficiency of light irradiation of the light emitting elements with a simple structure.

Moreover, another object of the present invention is to provide a reflective photosensor and a door controlling device of a vehicle which use the above lens.

Means for Solving the Problems

According to the present invention, the above objects are achieved by providing a photosensor lens configured to condense irradiation light from a plurality of light emitting elements 2 housed in a unit case 1 in a detection region 3 outside the unit case 1, and to condense reflected light from the detection region 3 at a light receiving element 4 in the unit case 1, wherein a single convex lens surface 5 is formed on one side of the photosensor lens, a light-receiving convex lens surface 6 sharing an optical axis with the single convex lens surface 5 and a plurality of light-emitting convex lens surfaces 7 are integrally formed on an opposite side of the photosensor lens, and each of the light-emitting convex lens surfaces 7 has an optical axis in parallel with the optical axis of the light-receiving convex lens surface 6 and is disposed on a circle centered at the light-receiving convex lens surface 6.

As shown in part (c) of FIG. 4, when the light emitting elements 2, which are point light sources, are disposed at the front focal point positions (f7) of plano-convex lenses 7a formed by the light-emitting convex lens surfaces 7, parallel light rays in parallel with optical axes 7b are formed inside the plano-convex lenses 7a formed by the light-emitting convex lens surfaces 7. These parallel light rays are refracted at the boundary with the single convex lens surface 5 and substantially focused at the rear focal point position (f5) of the single convex lens surface 5. Since the single convex lens surface 5 is formed such that its curvature is maintained constant over the whole surface, irradiation light from each light emitting element 2 is focused near the rear focal point position (f5) of the single convex lens surface 5. Thus, the amount of irradiation light to the rear focal point position (f5) can be increased effectively.

As a result, the amount of light delivered to the detection region 3 set at the rear focal point position (f5) or in the vicinity thereof is increased. Accordingly, the amount of reflected light from a detection object 11 having entered the detection region 3 is increased. The reflected light from the detection object 11 is introduced from the single convex lens surface 5 into the body of the lens and then focused at the rear focal point position (f6) of a plano-convex lens 6a formed by the light-receiving convex lens surface 6. Thus, the amount of light delivered to the light receiving element 4 disposed at this focal point position (f6) is increased as well. Accordingly, the detection accuracy is enhanced.

The layout of the light-emitting convex lens surfaces 7 and the light-receiving convex lens surface 6 can be set as appropriate. In the case of making a photosensor lens in which the light-emitting convex lens surfaces 7 are disposed on a circle centered at the light-receiving receiving convex lens surface 6, the light-emitting convex lens surfaces 7 compensate each other for the influence of the spherical aberration and the like. Thus, the amount of light emitted to the rear focal point position (f5) of the single convex lens surface 5 can be ensured.

Moreover, in the case of making a photosensor lens in which a groove 8 is formed at a boundary of the light-receiving convex lens surface 6 and each of the light-emitting convex lens surfaces 7, light from the light emitting elements 2 having entered the light-emitting convex lens surfaces 7 is prevented from becoming stray light which enters the light-receiving convex lens surface 6 and is read by the light receiving element 4. Thus, the detection accuracy is enhanced.

It suffices that the groove 8 is provided at the boundary of the light-receiving convex lens surface 6 and each of the light-emitting convex lens surfaces 7. However, the groove 8 may be formed along the whole circumference of the light-receiving convex lens surface 6.

Further, a photosensor unit using the lens described above may be made as a photosensor unit configured to emit irradiation light to an outside of a unit case 1 from a light emitting element 2 housed in the unit case 1, and to detect reflected light from the outside of the unit case 1 with a light receiving element 4 in the unit case 1, wherein the photosensor lens according to claim 1 or 2 is fixed to an opening of the unit case 1, and the light receiving element 4 is disposed at a position facing the light-receiving convex lens surface 6 of the photosensor lens, and the light emitting element 2 is disposed at each of positions facing the light-emitting convex lens surfaces 7.

As mentioned above, the irradiation light from the light emitting elements 2 in the unit case 1 can be focused by the photosensor lens described above at the rear focal point position (f5) of the single convex lens surface 5, or concentrated by the photosensor lens in the vicinity of the rear focal point position (f5) of the single convex lens surface 5 due to the influence of the spherical aberration and the like and also by disposing the light emitting elements 2 slightly offset from the front focal point positions (f7) of the light-emitting convex lens surfaces 7. Thus, by setting the position of the focus of irradiation light from each of the light emitting elements 2 in the detection region 3 as shown in FIG. 5, the amount of irradiation light to the detection region 3 can be efficiently increased with the number of light emitting elements 2, and the detection accuracy at the light receiving element 4 is improved as well.

Further, the photosensor unit described above can be used for a door controlling device of a vehicle together with a door controlling unit 10 configured to start a preparatory operation for moving a door of the vehicle when a detection object is detected based on a level of light reception at the light receiving element 4.

Effect of the Invention

According to the present invention, in the case of using a plurality of light emitting elements to form a reflective photosensor, the efficiency of light irradiation of the light emitting elements can be maximized with a simple structure.

MODE FOR CARRYING OUT THE INVENTION

Figure 1:
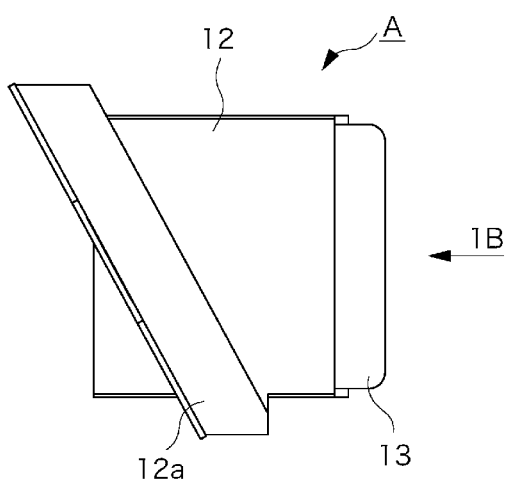
FIG. 1 is a set of views showing a photosensor unit, and part (a) is a side view and part (b) is a view as seen in the direction of arrow 1B in part (a).
Figure 1:
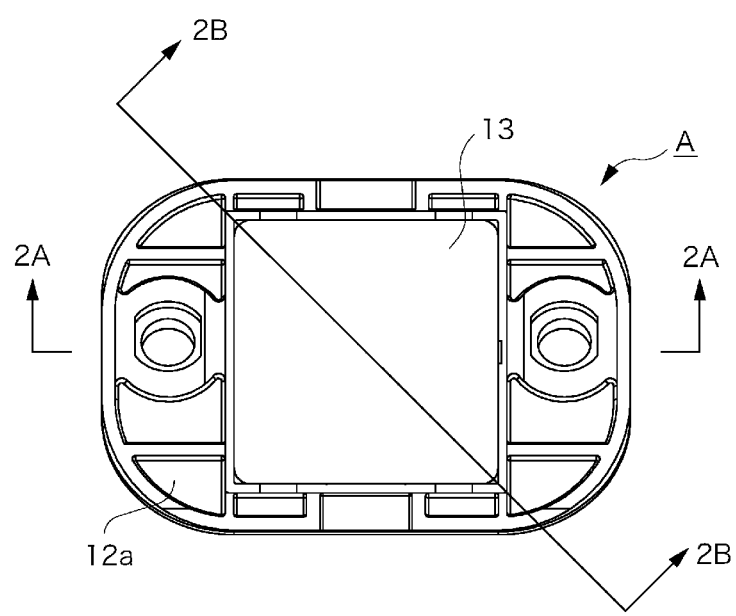

FIG. 1 and the subsequent drawings show a photosensor unit of the present invention. A photosensor unit (A) includes, as its constituent components, a unit case 1 fixed to a vehicle 9, and light emitting elements 2 and a light receiving element 4 housed in the unit case 1.

The unit case 1 includes a bracket 12 with a fixing flange 12a, and an inner case 13 fixed to the bracket 12. With a transparent synthetic resin material, the inner case 13 is formed in a tubular shape with one end closed, and is attached to the bracket 12 by inserting its open end into a front end opening of the bracket 12.

Infrared LEDs configured to emit invisible light pulses such as infrared rays are used as the light emitting elements 2 while a photodiode is used as the light receiving element 4. These light emitting elements 2 and light receiving element 4 are mounted on the surface of the same mounting board 14.

Figure 3:
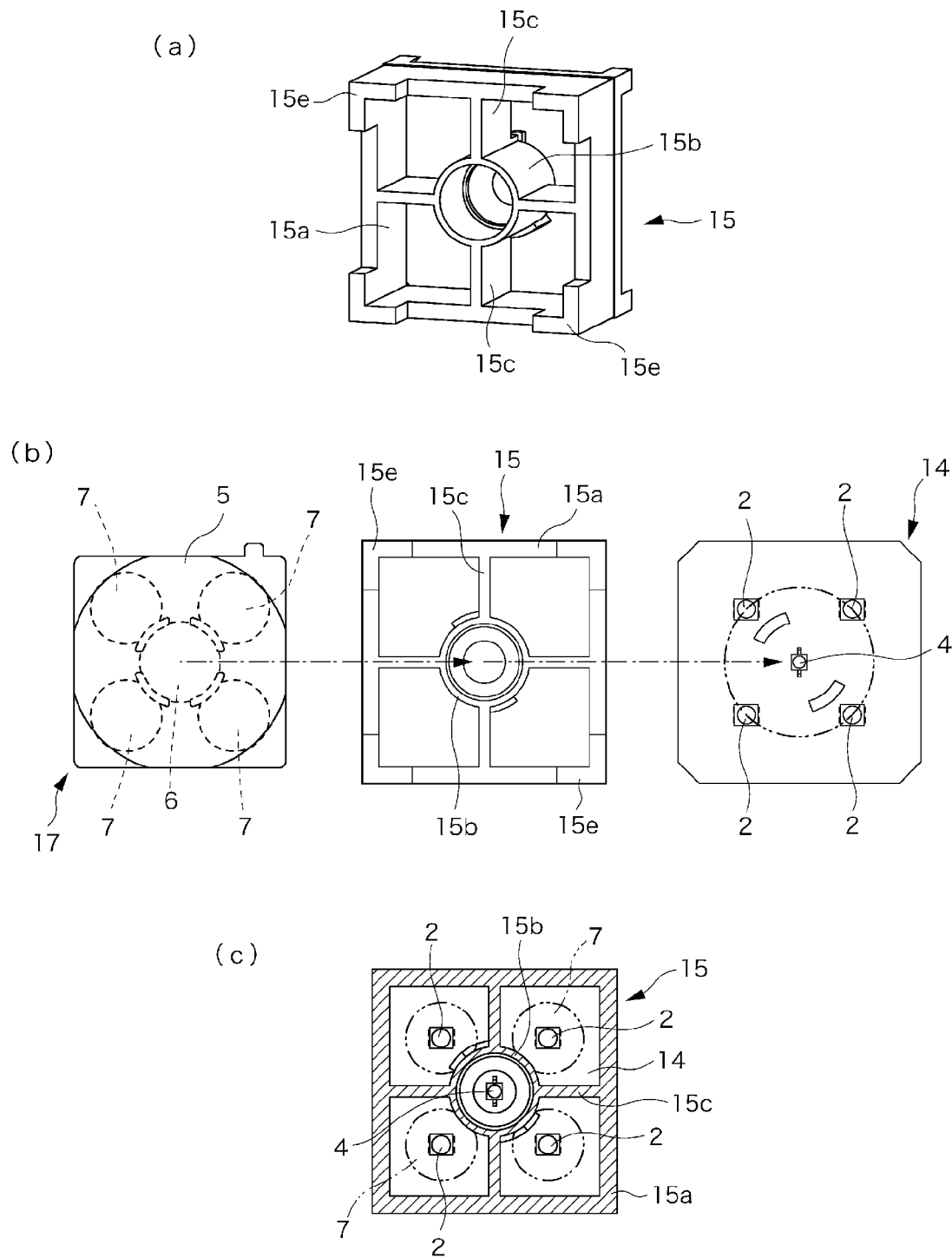
FIG. 3 is a set of views showing a partition member, and part (a) is a perspective view, part (b) is a set of views showing the positional relationship among the partition member, a mounting board, and a photosensor lens, and part (c) is a cross-sectional view taken along line 3C-3C in part (a) of FIG. 2.

As shown in FIG. 3, the light emitting elements 2 and the light receiving element 4 are disposed such that the light receiving element 4 is disposed on a center portion of the mounting board 14 while the light emitting elements 2 are disposed at an equal interval on a circle centered at the light receiving element 4.

A partition member 15 is attached inside the unit case 1 to prevent irradiation light (detection light) from the light emitting elements 2 from directly entering the light receiving element 4. As shown in part (a) of FIG. 3, the partition member 15 made of an opaque synthetic resin material includes: a rectangular frame portion 15a whose outer periphery substantially coincides with the outer periphery of the mounting board 14; a shield tube portion 15b disposed in the center of the rectangular frame portion 15a and opened on the upper and lower sides; and separating walls 15c connecting the shield tube portion 15b to the rectangular frame portion 15a.

Figure 2:
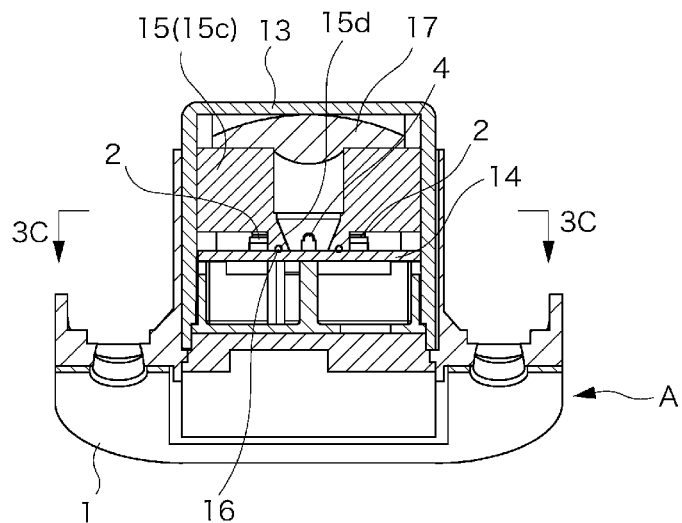
FIG. 2 is a set of cross-sectional views of FIG. 1, and part (a) is a cross-sectional view taken along line 2A-2A in part (a) of FIG. 1 and part (b) is a cross-sectional view taken along line 2B-2B in part (b) of FIG. 1.
Figure 2:
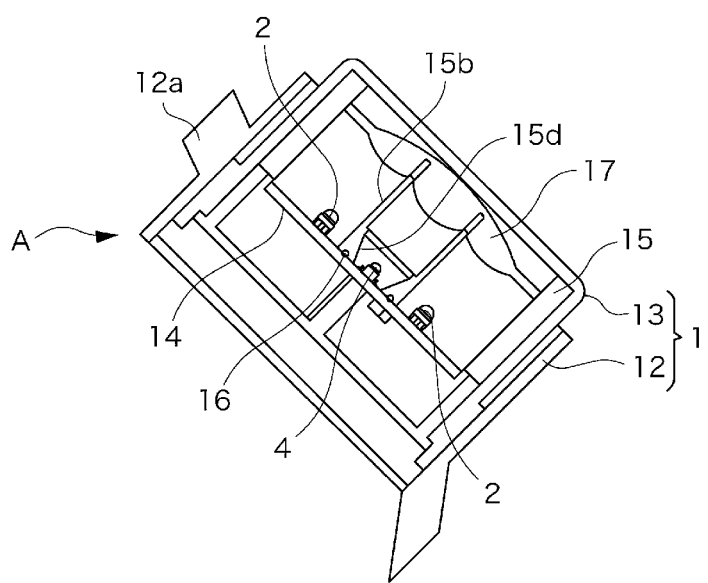

As shown in part (c) of FIG. 3, the mounting board 14 is attached to the partition member 15. In this state, a region around the light receiving element 4 is surrounded by the shield tube portion 15b and is therefore separated from the other space inside the unit case 1 as a passage space for reflected light from a detection object. As shown in FIG. 2, on the inner peripheral wall surface of the shield tube portion 15b, a tapered portion 15d is formed which gradually becomes larger in diameter toward the upper side from the mounting board 14 on which the light receiving element 4 is mounted. In this way, the efficiency of condensation of the reflected light by the mirror effect on the inner wall of the shield tube portion 15b is improved.

On the other hand, the space inside the rectangular frame portion 15a in the unit case 1 is separated by the separating walls 15c and used as passage spaces for the detection light emitted from the light emitting elements 2. In this example, four passage spaces are formed for the detection light to match the number of the light emitting elements 2, and each light emitting element 2 is disposed in a center portion of its passage space.

Further, as shown in FIG. 2, an O-ring 16 is attached to the lower end surface of the partition member 15, thereby completely preventing leakage of light through the boundary portion of the partition member 15 and the mounting board 14. As a result, a region from the surface on which the light receiving element 4 is mounted to the front end of the partition member 15 is completely isolated from a region to which light is emitted from the light emitting elements 2. Thus, directly entry of the emitted light into the light receiving element 4 is securely prevented.

Furthermore, a photosensor lens 17 is attached to an upper end portion of the partition member 15.

Figure 4:
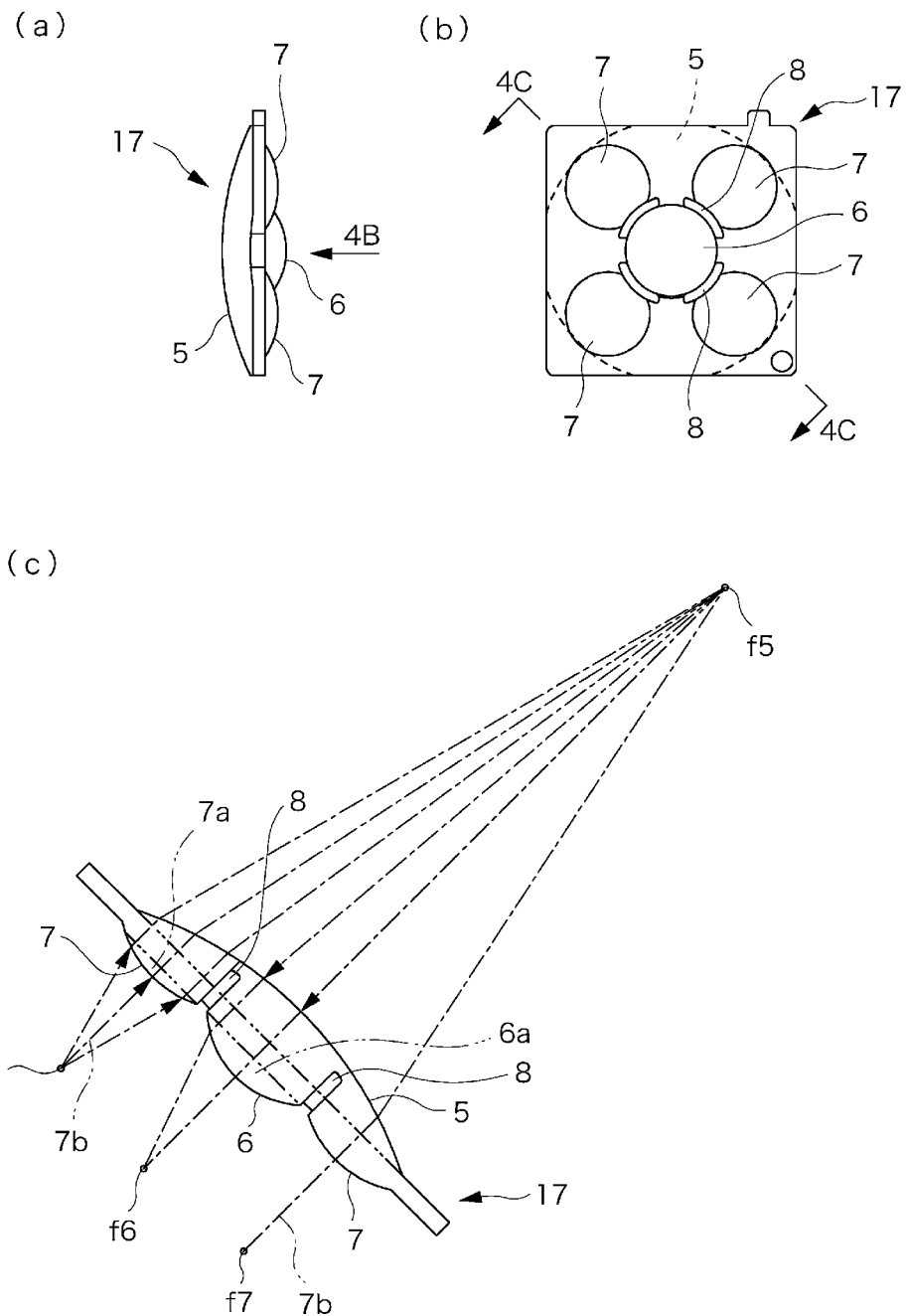
FIG. 4 is a set of views showing the photosensor lens, and part (a) is a side view, part (b) is a view as seen in the direction of arrow 4B in part (a), and part (c) is a cross-sectional view taken along line 4C-4C in part (b).

As shown in FIG. 4, the photosensor lens 17 is formed from an acrylic resin in a square shape in a plan view. It has a single convex lens surface 5 over substantially the entire surface on the upper side (object side) and has one light-receiving convex lens surface 6 and a plurality of light-emitting convex lens surfaces 7 on the opposite side (light-source side).

Each of the convex lens surfaces 5, 6, and 7 is formed by a spherical surface. The light-receiving convex lens surface 6 has a diameter substantially equal to the inner diameter of the shield tube portion 15b of the partition member 15 and is disposed at the center of the photosensor lens 17. This light-receiving convex lens surface 6 and the single convex lens surface 5 are situated in such a way as to share a rotation axis about which their spherical surfaces are defined by rotation. These single convex lens surface 5 and light-receiving convex lens surface 6 are attached by being positioned such that the above-mentioned shared rotation axis which serves as an optical path in the case where the single convex lens surface 5 and the light-receiving convex lens surface 6 are each a plano-convex lens, coincides with the center axis of the shield tube portion 15b of the partition member 15.

In order to position the photosensor lens 17, positioning pillars 15e configured to be in contact with the four corners of the photosensor lens 17 are provided on the upper end of the partition member 15.

On the other hand, each light-emitting convex lens surface 7 is formed such that the optical axis thereof is in parallel with the optical axis of the light-receiving convex lens surface 6 and the diameter thereof is substantially equal to the length of one side of a section separated by the separating walls 15c of the partition member 15, and is disposed such that one light emitting element 2 is located on each optical axis. A groove 8 is formed at the boundary portion of the light-emitting convex lens surface 7 and the light-receiving convex lens surface 6 and prevents irradiation light introduced from the light-emitting convex lens surface 7 from entering the region of the light-receiving convex lens surface 6.

Thus, in this embodiment, with the light emitting element 2 situated at the front focal point position (f7) of the light-emitting convex lens surface 7, the irradiation light from the light emitting element 2 is converted into parallel light by the light-emitting convex lens surface 7, travels through the photosensor lens 17, and is then condensed by the single convex lens surface 5 at the rear focal point position (f5) of the single convex lens surface 5.

Figure 5:
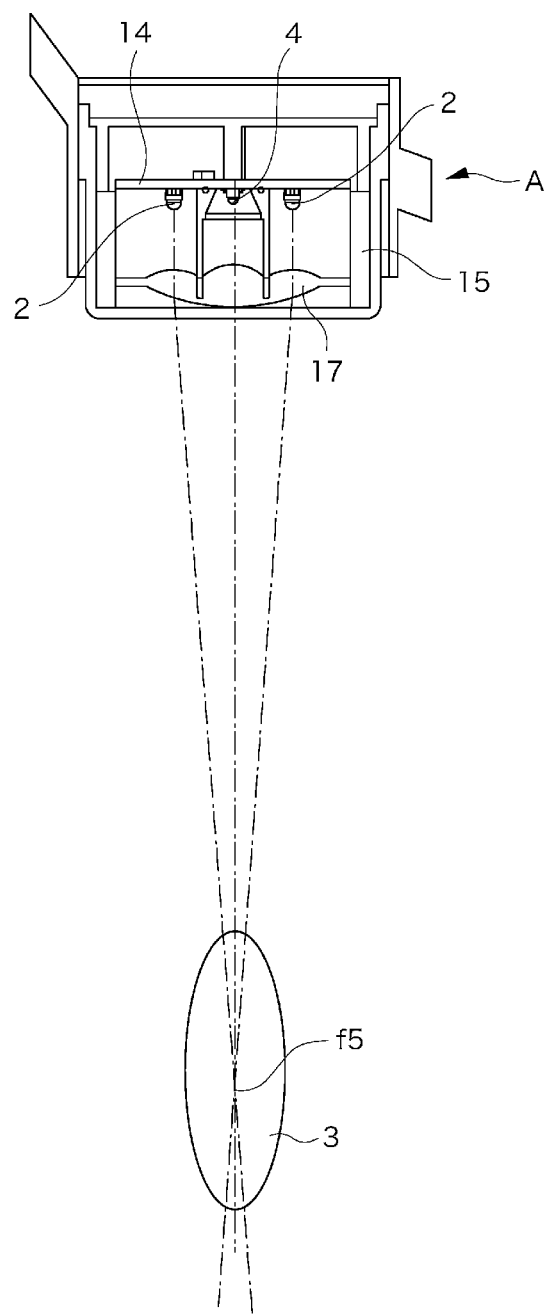
FIG. 5 is a view showing the detection region of the photosensor unit.

Thus, by setting a detection region 3 near the rear focal point position (f5) of the single convex lens surface 5 in a state where the photosensor unit (A) is fixed as shown in FIG. 5, the amount of detection light in the detection region 3 can be increased. In addition, reflected light from a detection object 11 which has entered the detection region 3 is condensed by the single convex lens surface 5 and the light-receiving convex lens surface 6 and thereby efficiently delivered to the light receiving element 4. Accordingly, high detection accuracy can be achieved.

Figure 6:
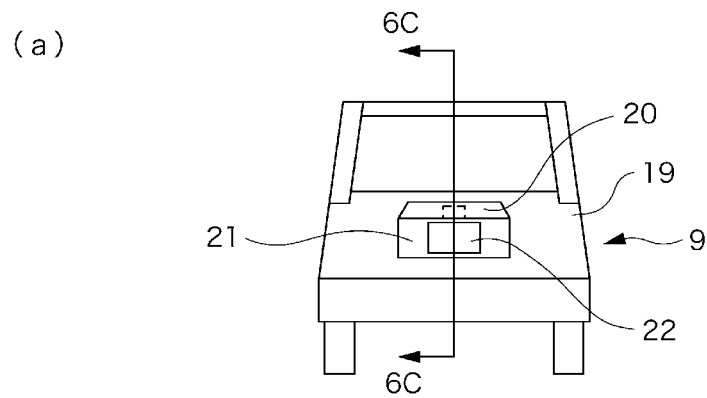
FIG. 6 is a set of views showing a vehicle to which the present invention is applied, and part (a) is a view of the vehicle as seen from the rear, part (b) is a side view of the vehicle, and part (c) is a cross-sectional view taken along line 6C-6C in part (a).
Figure 6:
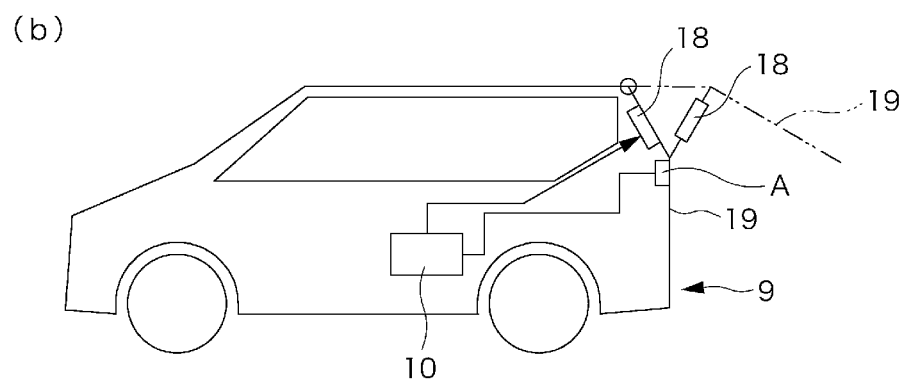
Figure 6:
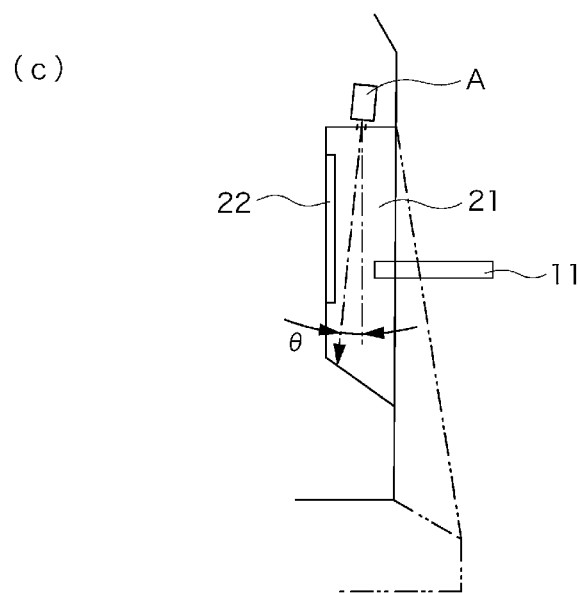

FIG. 6 shows a door controlling device in which the photosensor unit (A) described above is used.

The door controlling device is configured as a back-door controlling device for controlling opening-closing operations of a power back door which is driven by a driving device 18 such as a damper device. The door controlling device includes the photosensor unit (A) fixed to a back door 19 of the vehicle 9, and a door controlling unit 10 for controlling the driving device 18.

The photosensor unit (A) is configured to output a detection signal when detecting that the detection object 11 enters the predetermined detection region 3 into which the detection light is emitted. The photosensor unit (A) is fixed to an upper wall portion of a license-plate attaching recess 21 covered by a license-plate finisher 20. Note that reference numeral 22 in FIG. 6 denotes a license plate.

Moreover, in this example, the optical axis of the detection light is inclined slightly toward to the inside of the vehicle 9 (by an angle θ) so that the center of the detection region 3 of the photosensor unit (A) can be situated inside the license-plate attaching recess 21. In this way, it is possible to prevent unnecessary reaction of the photosensor unit (A) by a person, animal, trash or the like other than the user of the vehicle 9 present near the vehicle 9, which would otherwise occur due to decrease in detection performance outside the license-plate attaching recess 21.

In this example, when the photosensor unit (A) outputs a detection signal, the door controlling unit 10 first performs preparatory operations such as authentication of an electronic key the user has, detection of the state of the back door, and a locking-unlocking operation, and then drives the driving device 18. The authentication of the electronic key is performed by authenticating an authentication code outputted by the electronic key through communication with an authentication device not shown. If the authentication is successful, the back door 19 is unlocked on condition that the back door 19 is closed, and the driving device 18 is then driven to start a door opening operation.

Thus, in this embodiment, even when the user's hands are full with luggage or the like, the user can open the back door 19 only by moving the luggage or the like to the inside of the license-plate attaching recess 21 or the vicinity thereof which are set as the detection region 3 so that the photosensor unit (A) can detect the luggage or the like as the detection object 11. Accordingly, the convenience is improved.

EXPLANATION OF REFERENCE NUMERALS

1 UNIT CASE
2 LIGHT EMITTING ELEMENT
3 DETECTION REGION
4 LIGHT RECEIVING ELEMENT
5 SINGLE CONVEX LENS SURFACE
6 LIGHT-RECEIVING CONVEX LENS SURFACE
7 LIGHT-EMITTING CONVEX LENS SURFACE
8 GROOVE
9 VEHICLE
10 DOOR CONTROLLING UNIT

The invention claimed is:

1. A photosensor unit configured to emit irradiation light to an outside of a unit case from a plurality of light emitting elements housed in the unit case, and to detect reflected light from the outside of the unit case with a light receiving element in the unit case, the photosensor unit comprising:
   a photosensor lens fixed to an opening of the unit case and configured to condense the irradiation light from the plurality of light emitting elements in a detection region outside the unit case, and to condense the reflected light from the detection region at the light receiving element in the unit case;
a single convex lens surface formed on one side of the photosensor lens;
a light-receiving convex lens surface sharing an optical axis with the single convex lens surface, and a plurality of light-emitting convex lens surfaces integrally formed on an opposite side of the photosensor lens; wherein
each of the plurality of light-emitting convex lens surfaces has an optical axis in parallel with the optical axis of the light-receiving convex lens surface and is disposed on a circle centered at the light-receiving convex lens surface; and
the light receiving element is disposed at a rear focal point position of the light-receiving convex lens surface, and each of the plurality of light emitting elements is disposed at a respective front focal point position of each of the plurality of light-emitting convex lens surfaces.

2. A door controlling device of a vehicle, comprising:
the photosensor unit according to claim 1 attached to the vehicle; and
a door controller configured to start a preparatory operation for moving a door of the vehicle when a detection object is detected based on a level of light reception at the light receiving element.

3. The photosensor unit according to claim 1, wherein the plurality of light emitting elements and the light receiving element are located on a surface of a same mounting board.

4. The photosensor unit according to claim 1, wherein the photosensor lens is located on a partition wall member disposed on a mounting board.

* * * * *